United States Patent
Chen

(10) Patent No.: US 8,072,691 B2
(45) Date of Patent: Dec. 6, 2011

(54) LENS MODULE HAVING INTERCOUPLING SLITS AND RESTRICTING MEMBERS

(75) Inventor: Yen-Chun Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 38 days.

(21) Appl. No.: 12/718,083

(22) Filed: Mar. 5, 2010

(65) Prior Publication Data

US 2010/0277814 A1    Nov. 4, 2010

(30) Foreign Application Priority Data

Apr. 29, 2009    (CN) .......................... 2009 1 0301958

(51) Int. Cl.
  *G02B 15/14*    (2006.01)
(52) U.S. Cl. ........................................................ 359/704
(58) Field of Classification Search .......... 359/699–704, 359/821–828
See application file for complete search history.

(56) References Cited

U.S. PATENT DOCUMENTS 5,381,272 A *    1/1995    Kato et al. ..................... 359/823
  2008/0031612 A1*    2/2008    Chang .......................... 396/144

* cited by examiner

*Primary Examiner* — Ricky Mack
*Assistant Examiner* — Vipin Patel
(74) *Attorney, Agent, or Firm* — Altis Law Group, Inc.

(57) ABSTRACT

An exemplary lens barrel includes an accommodating member having a cylinder, a lens barrel, a holder for fixing the accommodating member, and a resilient member. The cylinder has a plurality of stepwise slits each having an end exposed at an underside surface thereof. The lens barrel has a plurality of restricting elements extending from an outer surface thereof. The lens barrel is coaxially accommodated in the cylinder with the restricting element passing through a corresponding slit. The resilient member is sandwiched between the lens barrel and the holder, capable of changing its length under an external force, such that a focal length of the lens module is adjustable when the restricting elements move in and along the slits.

11 Claims, 7 Drawing Sheets

LENS MODULE HAVING INTERCOUPLING SLITS AND RESTRICTING MEMBERS

BACKGROUND

1. Technical Field

The present disclosure relates to a lens module, and more particularly, a lens module having intercoupling slits and restricting members.

2. Description of Related Art

A conventional zoom lens module generally includes at least one lens, an image sensor and an actuator, such as a step motor for driving the lenses to move relative to the image sensor for obtaining a desired focal length. However, the zoom lens module is expensive. Furthermore, the step motor is relatively large in volume, thus a significant amount of space is needed for movement of the lenses, which makes it very difficult to reduce a volume of the lens module.

Therefore, a lens module to overcome the problems described above is needed.

BRIEF DESCRIPTION OF THE DRAWINGS

Many aspects of the lens module can be better understood with reference to the following drawings. The components in the drawings are not necessarily drawn to scale, the emphasis instead being placed upon clearly illustrating the principles of embodiments of the lens module. Moreover, in the drawings, all the views are schematic, and like reference numerals designate corresponding parts throughout the different views.

DETAILED DESCRIPTION

Figure 1:
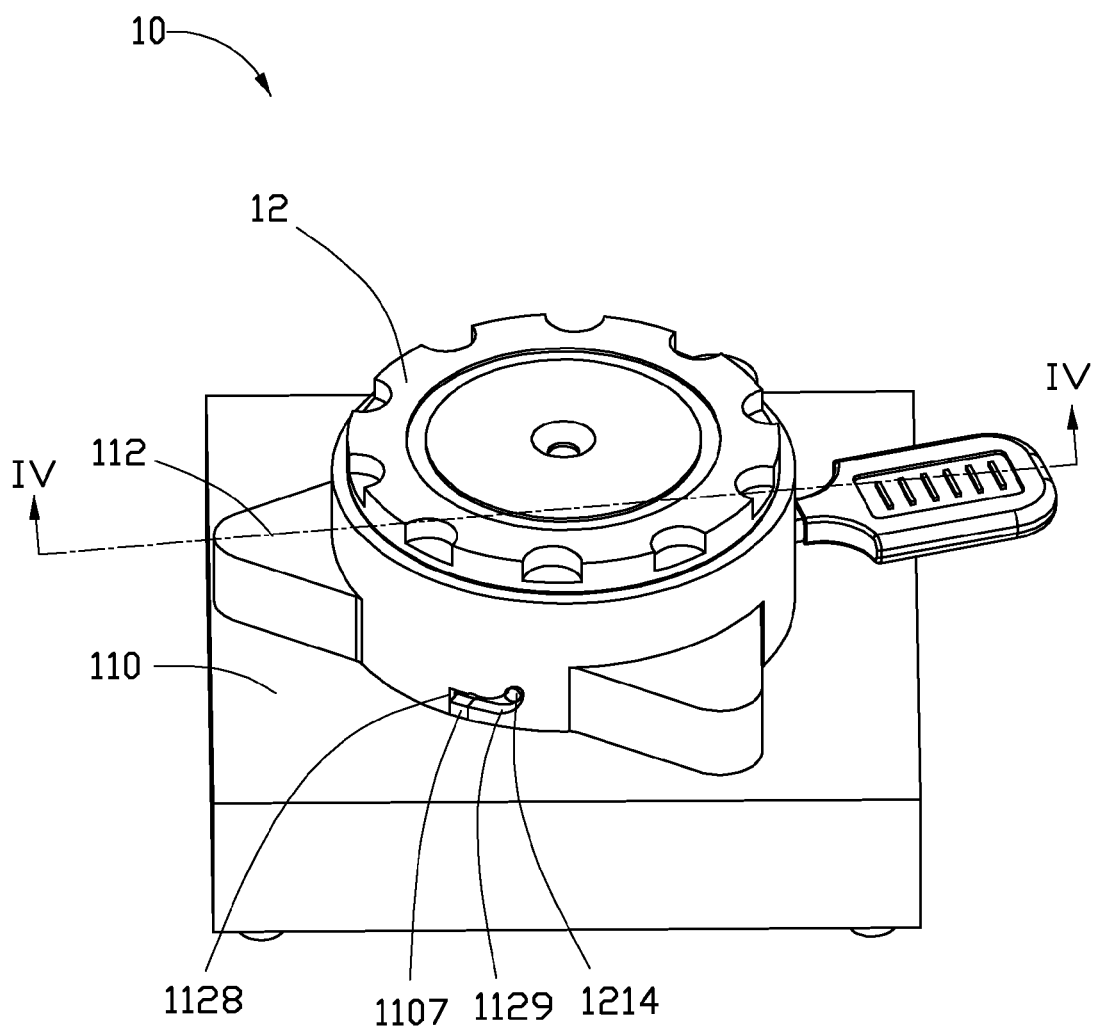
FIG. 1 is a schematic, perspective view of a lens module in accordance with a first embodiment.
Figure 2:
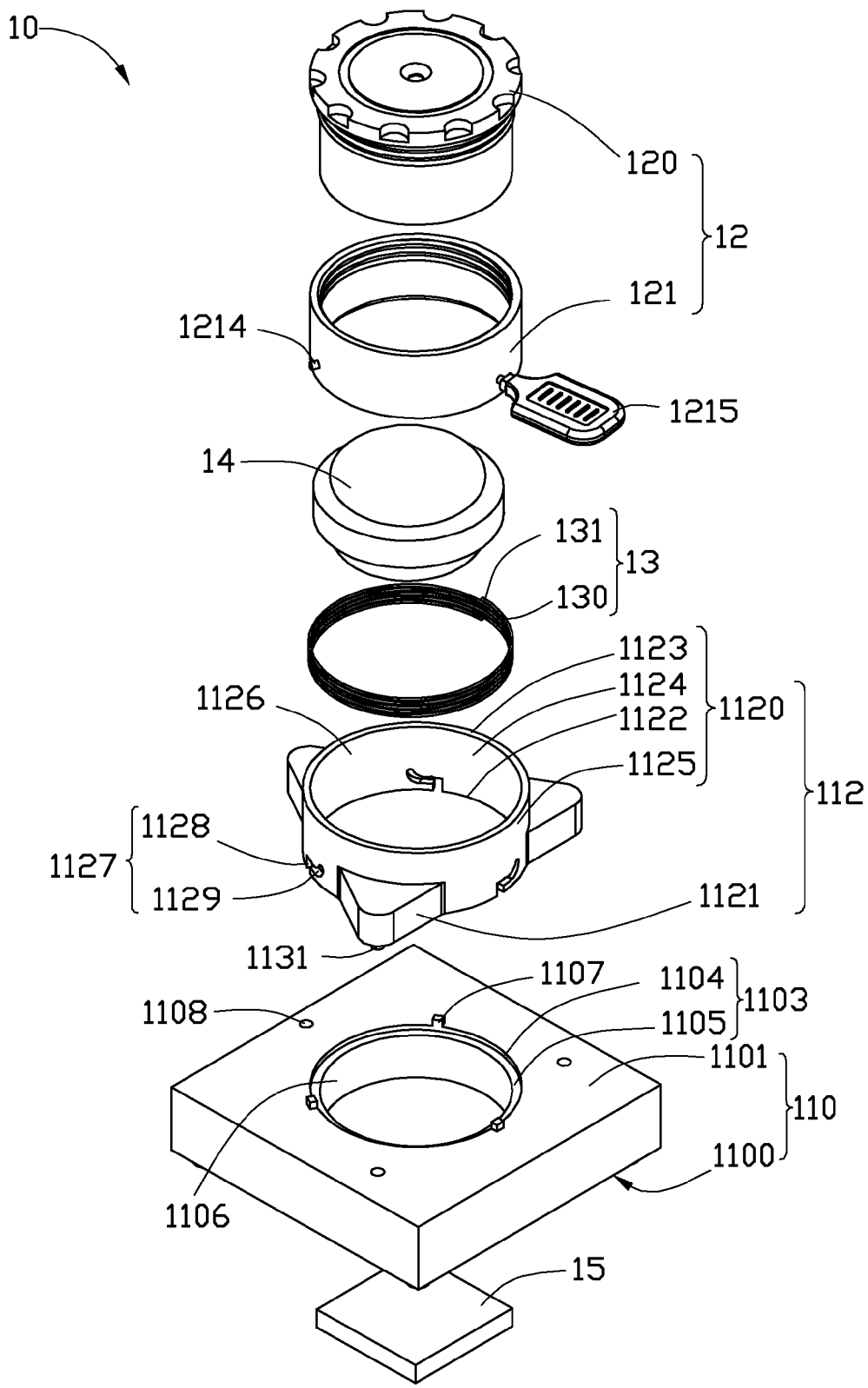
FIG. 2 is an isometric, exploded view of the lens module of FIG. 1.
Figure 3:
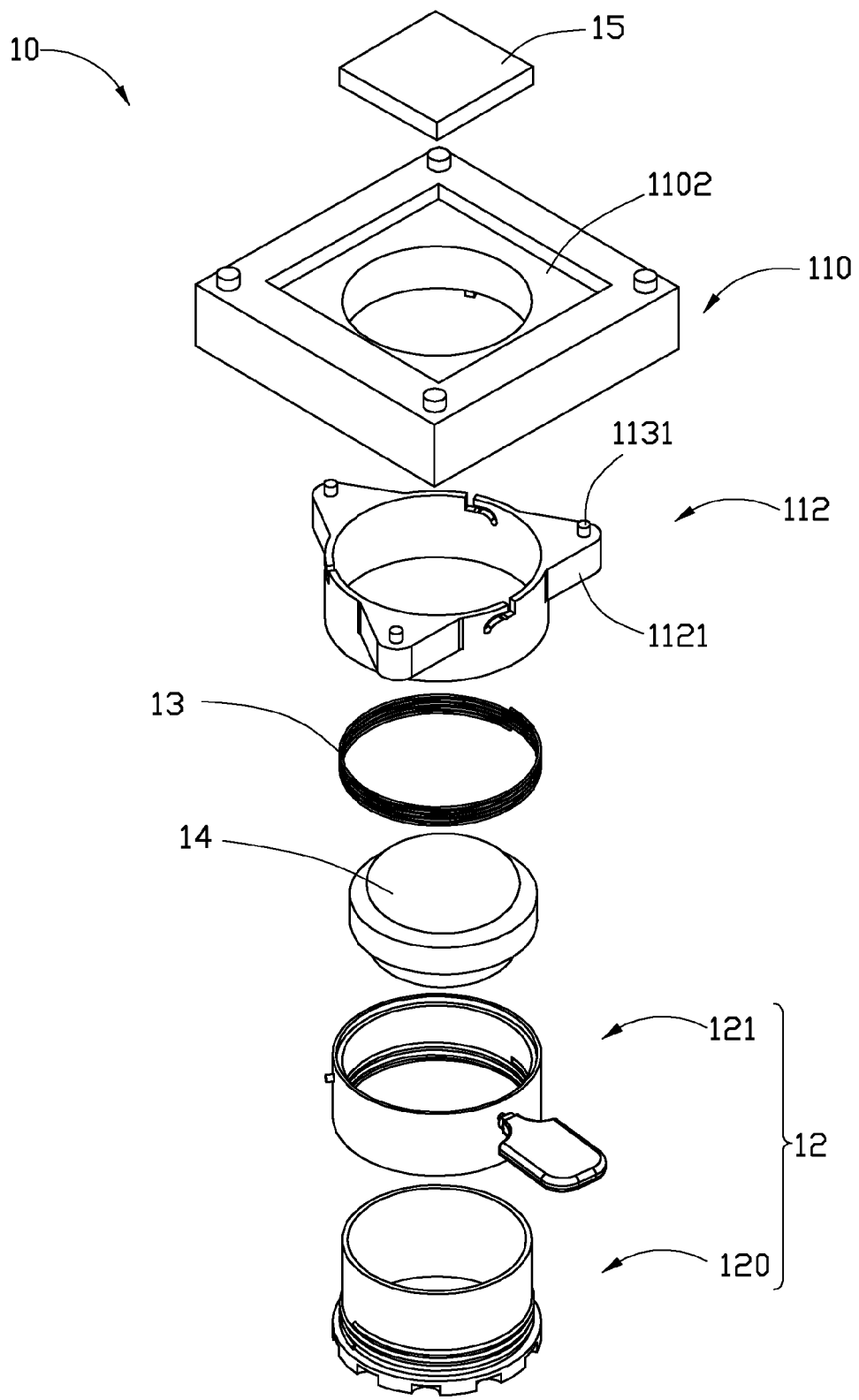
FIG. 3 shows another isometric, exploded view of the lens module of FIG. 1.
Figure 4:
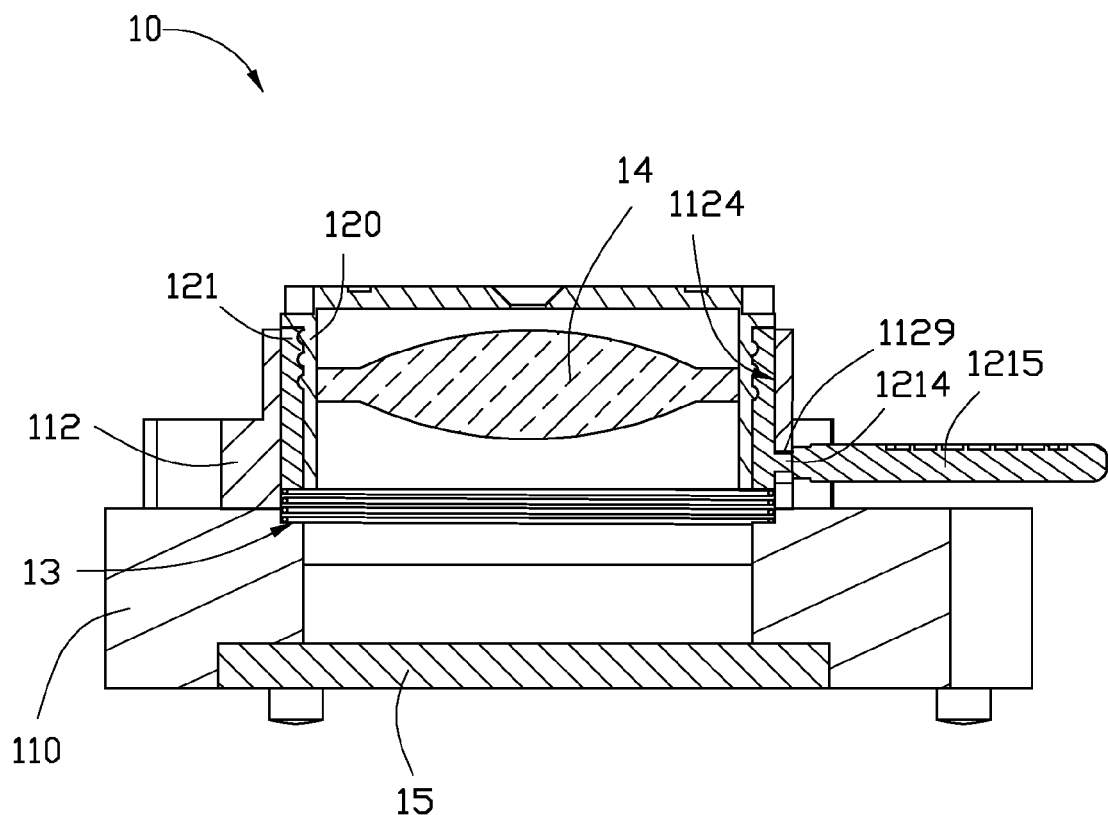
FIG. 4 is a sectional view of the lens module of FIG. 1, corresponding to line IV-IV.

Referring to FIGS. 1-3, a lens module 10 provided in an exemplary embodiment includes a holder 110, an accommodating member 112, a lens barrel 12, a resilient member 13, an optical member 14 and an image sensor 15.

The holder 110 has a first surface 1100, a second surface 1101 opposite to the first surface 1100, a first through hole 1103, a second through hole 1106 and an accommodating room 1102 in the central portion. The first and second through holes 1103, 1106, and the first accommodating room 1102 are coaxially and communicatively arranged in that order from the first surface 1100 towards the second surface 1101. The diameter of the second through hole 1103 is respectively less than those of the first through hole 1103 and the accommodating room 1102. That means, the first through hole 1103, the second through hole 1106 and the accommodating room 1102 cooperatively form a stepped through hole (not labeled). Therefore, a side surface 1104 and a fixing surface 1105 are exposed from the first through hole 1103. Additionally, the holder 110 has three uniformly arranged cuboid protrusions 1107. The protrusions 1107 extends from the first surface 1101 and around the first through hole 1103. In addition, three positioning cavities 1108 are defined in the second surface 1101.

The accommodating member 112 is detachably fixed on the second surface 1101 of the holder 110, including an cylinder 1120 for accommodating the lens barrel 12, and three triangular fixing elements 1121.

The cylinder 1120 has a first end surface 1122, a second end surface 1123 opposite to the first end surface 1122, a first inner surface 1124 and a first outer surface 1125 opposite to the first inner surface 1124. The first end surface 1122 is adjacent to the second surface 1101 of the holder 110. The cylinder 1120 has uniformly arranged three slits 1127 for restricting the protrusions 1107. Each slit 1127 passes through the inner surface 1124 and the outer surface 1125, rooting from the first end surface 1122 with curved endings at an intermediate position of the cylinder 1120, that means, each slit 1127 has an end exposed at an underside surface thereof. In detail, the slit 1127 is consisted of a first straight portion 1128 and a second curved portion 1129. The first portion 1128 starts from the first end surface 1122, extends in a direction parallel to the central axis of the cylinder 1120, and ends at a predetermined position of the cylinder 1120. The second portion 1129 communicates with the first portion 1128 at the predetermined position and ends at the intermediate position of the cylinder 1120.

The fixing element 1121 perpendicularly extends from the first outer surface 1125 and are spaced from each other. Each fixing element 1121 has a fixing rod 1131 extending downward. Each fixing rod 1131 corresponds to a positioning cavity 1108 such that the fixing rod 1131 can be fitted into the positioning cavity 1108 and the cylinder 1120 is detachably fixed on the holder 110.

The lens barrel 12 includes an outer barrel 121 and an inner barrel 120 threadedly engaged in the outer barrel 121. The inner barrel 120 is configured for accommodating the optical member 14. The outer barrel 121 has three restricting elements 1214 corresponding to the slits 1127. The restricting elements 1214 perpendicularly extend from an outer surface of the outer barrel 121. The outer barrel 121 is accommodated in the cylinder 1120 with the restricting element 1214 passing through a corresponding slit 1127. In addition, the outer barrel 121 has a handle 1215 perpendicularly extending from the out surface of the outer barrel 121 and connecting to one of the restricting elements 1214. When applying an external force directly perpendicular to the central axis of the outer barrel 121 on the handle 1215, the restricting elements 1214 are movable in the slits 1127, and the lens barrel 12 is resultantly movable in a direction parallel to the central axis.

The resilient element 13 is accommodated in the first through hole 1103 and sandwiched between the outer barrel 12 and the holder 110. In detail, an end 130 of the resilient element 13 is fixed on the fixing surface 1105, and another end 131 of the resilient element 13 contacts an end portion of the cylinder 121. The resilient element 13 is capable of changing its length under an external force and recovering its original length when the external force is withdrawn. When the resilient element 13 keeps its natural shape, the restricting elements 1214 are restricted at the end of the second portion 1129 of the slits 1127. When the resilient element 13 is shortened, the restricting elements 1214 are restricted at the first portion 1128 of the slits 1127. In the present embodiment, the resilient element 13 is a coil spring.

The optical member 14 is accommodated in the inner barrel 120, and can be selected from the group consisting of optical lenses, spacers, filters etc. In the present embodiment, the optical member 14 is a plastic lens.

The image sensor 15 is accommodated in the accommodating room 1102 of the holder 110, and exposed from the stepped through hole, configured for converting light beams emitted from an object in front of the optical member 14 and penetrated the optical member 14 into electronic signals. The image sensor 15 is a CCD packaged using a conventional ceramic leaded chip carrier method.

In assembly of the lens module 10, the inner barrel 120 is first screwed into the outer barrel 121, forming the lens barrel 12. The lens barrel 12 is then accommodated into the accommodating member 1120 with the restricting element 1214 passing through and blocked at the second portion 1129 of a corresponding slit 1127. An end of the resilient member 13 is subsequently fixed on the fixing surface 1105 of the holder 1105. The accommodating member 112 is fixed on the holder 110, and the image sensor 15 is packaged in the accommodating room 1102 of the holder 110. In detail, the outer barrel 121 contacts the other end of the resilient member 13 with the resilient member 13 in its natural shape, the protrusions 1107 is fixed in the first portion 1128 of the slit 1127, and the fixing rod 1131 is inserted into a corresponding positioning cavity 1108. In this situation, a first desired focal length of the lens module 10 is obtained.

Figure 5:
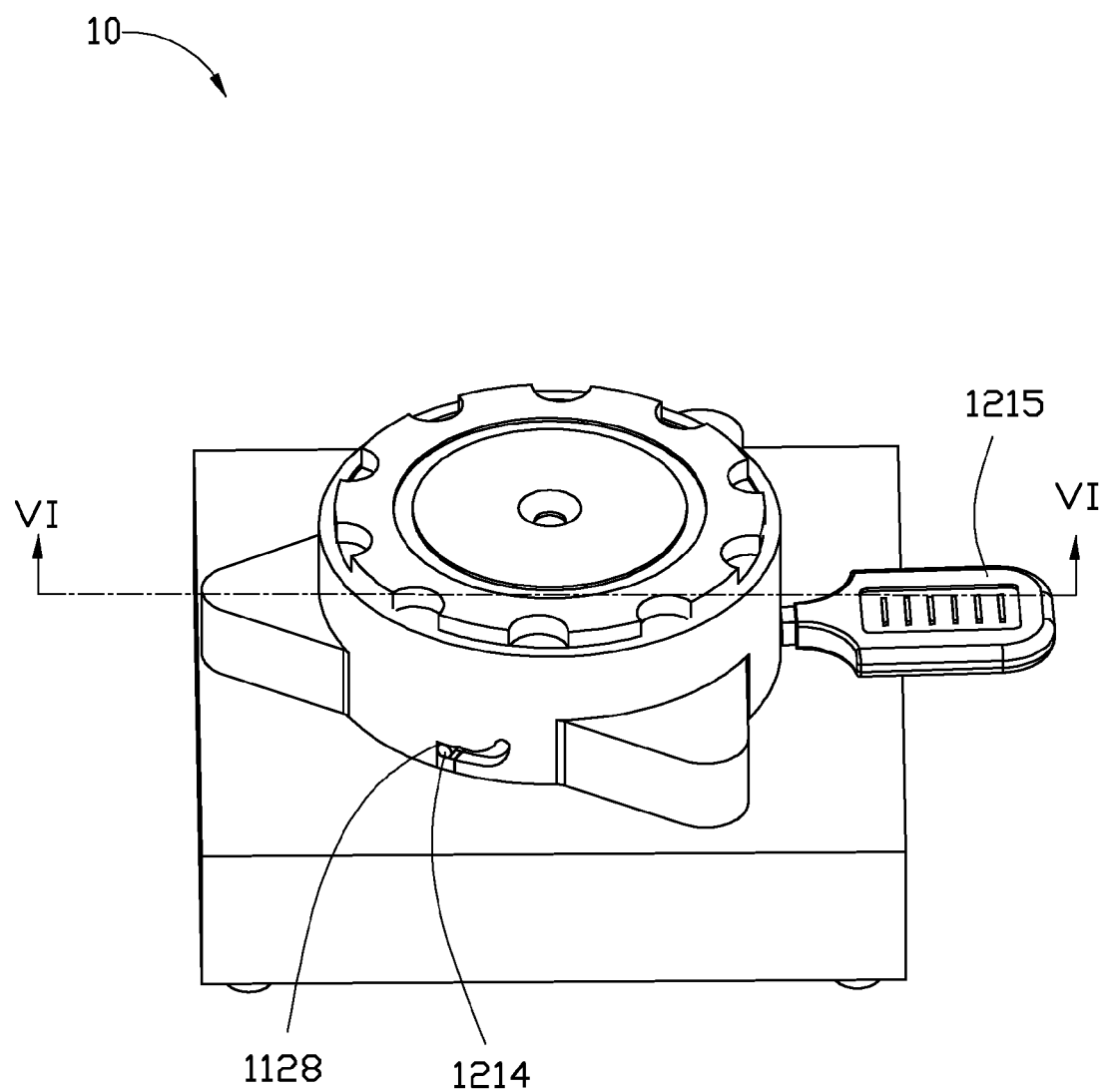
FIG. 5 shows the lens module of FIG. 1 in a focus state.
Figure 6:
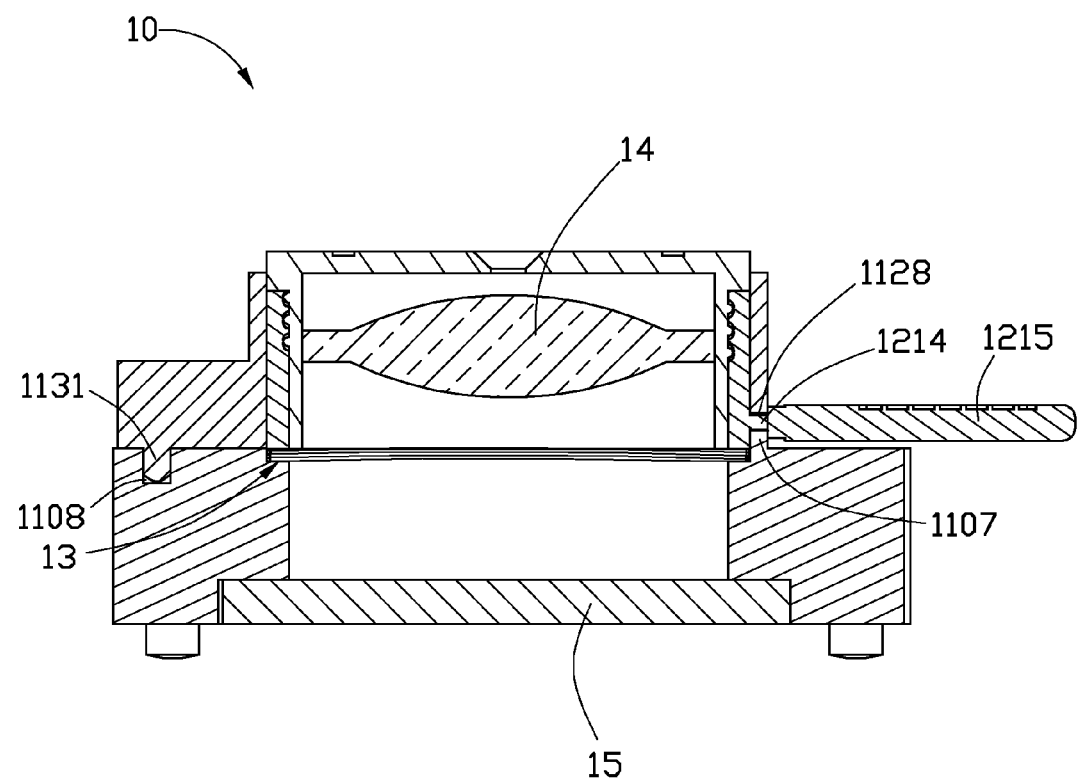
FIG. 6 shows a sectional view of the lens module of FIG. 5, corresponding to line VI-VI.

Referring to FIGS. 5 and 6, when applying an external force on the handle 1215, the resilient member 13 is shortened, and the restricting elements 1214 move in a corresponding slit 1127 from the second portion 1129 toward the first portion 1128 and blocked at the first portion 1128. Therefore, the lens barrel 12 moves toward the holder 110. In such way, a second desired focal length of the lens module 10 is obtained.

It should be noted that, the slits 1127 can include a plurality of alternately arranged straight portions 1128 and the curved portions 1129. The image sensor 15 can be packaged using a conventional chip scale package method.

Figure 7:
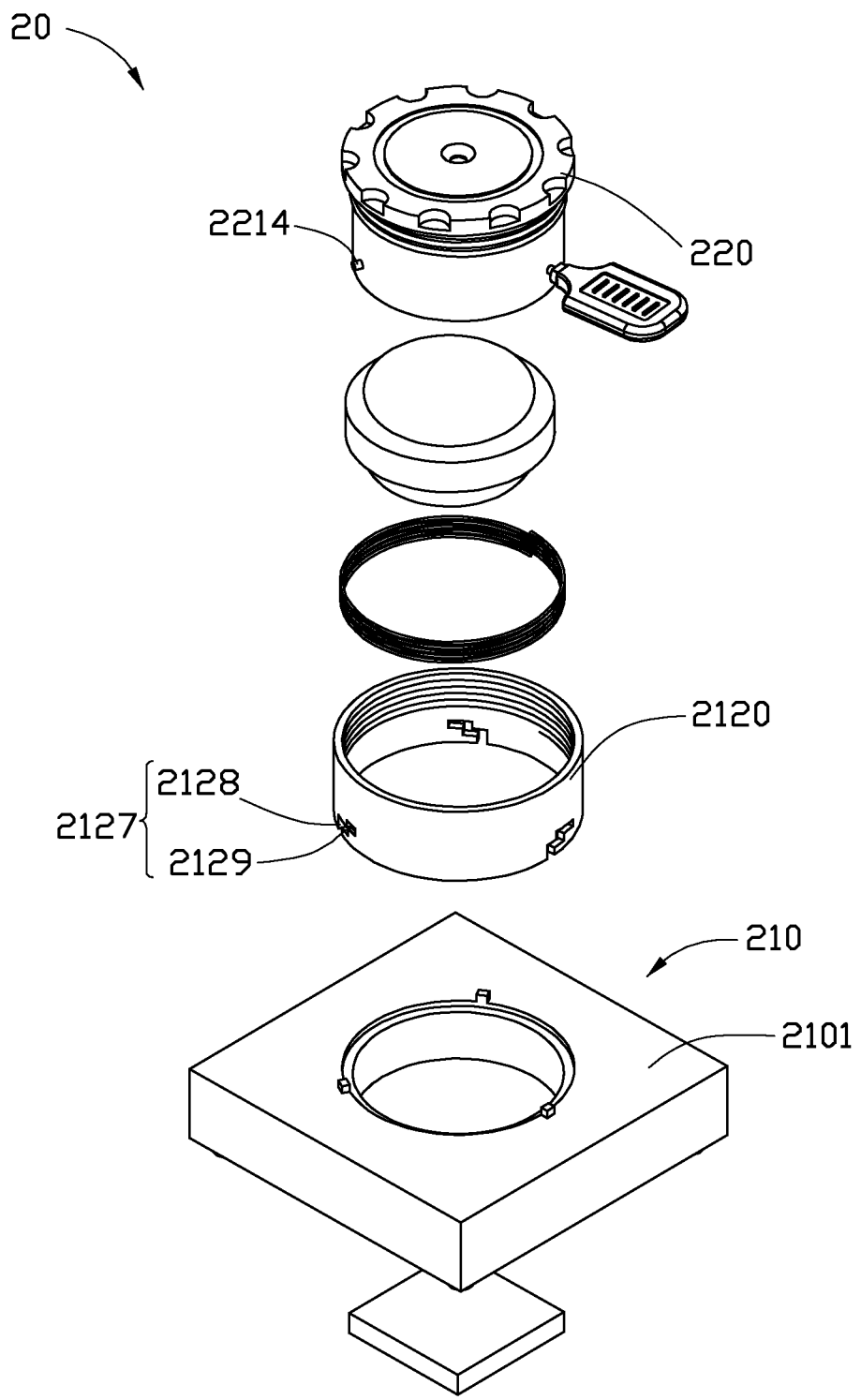
FIG. 7 is an isometric, exploded view of a lens module in accordance with a second embodiment.

Referring to FIG. 7, another lens module 20 provided in a second embodiment that has similar configuration with the lens module 10, differing in that the restricting elements 2214 are formed on the outer surface of the inner barrel 220. Each of the slits 2127 includes two first straight portions 2128 and two second straight portions 2129. The first and second straight portions 2128, 2129 are alternately arranged. Especially, the second straight portions, those are perpendicular to the central axis of the cylinder 2120. In addition, the cylinder 2120 is directly attached on the second surface 2101 of the holder 210.

While certain embodiments have been described and exemplified above, various other embodiments will be apparent from the foregoing disclosure to those skilled in the art. The present disclosure is not limited to the particular embodiments described and exemplified but is memberable of considerable variation and modification without departure from the scope and spirit of the appended claims.

What is claimed is:

1. A lens module, comprising:
   an accommodating member having a cylinder, the cylinder having a plurality of stepwise slits each having an end exposed at an underside surface thereof;
   a lens barrel having a plurality of restricting elements extending from an outer surface thereof, the lens barrel being coaxially accommodated in the cylinder with each of the restricting element passing through a corresponding one of the slits;
   a holder for fixing the accommodating member, and comprising a stepped through hole, a fixing surface exposed in the stepped through hole, and a plurality of protrusions around the stepped through hole, each of the protrusions being inserted in one of the slits at the end thereof, and each of the restricting elements being movable in and along the corresponding one of the slits; and
   a resilient member sandwiched between the lens barrel and the holder with an end of the resilient member fixed on the fixing surface, the resilient member being capable of changing the length thereof under an external force and recovering the original length with the external force withdrawn, such that a focal length of the lens module is adjustable by moving the restricting elements in and along the slits.

2. The lens module of claim 1, wherein each of the slits has a first straight portion and a second curved portion communicating with the first straight portion, the first straight portion exposed at the underside surface and extending in a direction parallel to a central axis of the cylinder.

3. The lens module of claim 2, wherein each of the protrusions is located at a bottom of the corresponding first straight portion, each of the restricting elements is movable between a top of the corresponding first straight portion on the corresponding protrusion where the resilient element is shortened and an end of the corresponding second curved portion where the resilient element recovers the original length thereof.

4. The lens module of claim 1, wherein each of the slits has a plurality of alternately arranged first straight portions and second straight portions, and the second portions are perpendicular to the central axis of the cylinder.

5. The lens module of claim 1, wherein the lens barrel further comprises a handle connected with one of the restricting members.

6. The lens module of claim 1, wherein the accommodating member further comprises a plurality of fixing elements extending from an outer surface of the cylinder for fixing the cylinder on the holder.

7. The lens module of claim 1, wherein the lens barrel comprises an outer barrel and an inner barrel coaxially accommodated in the outer barrel, the inner barrel is configured for accommodating optical members, the restricting elements are formed on the outer barrel.

8. The lens module of claim 7, wherein the inner barrel is threadedly engaged in the outer barrel.

9. The lens module of claim 1, further comprising an image sensor opposite to the lens barrel.

10. The lens module of claim 9, wherein the image sensor is accommodated in the holder and exposed from the stepped through hole.

11. A lens module, comprising:
    an accommodating member having a cylinder, the cylinder having a plurality of stepwise slits each having an end exposed at an underside surface thereof;
    a lens barrel having a plurality of restricting elements extending from an outer surface thereof, and a handle connected with one of the restricting members, the lens barrel being coaxially accommodated in the cylinder with each of the restricting element passing through a corresponding slit, when applying an external force directly perpendicular to a central axis of the lens barrel on the handle, the restricting elements are movable in the slits, and the lens barrel is resultantly movable in a direction parallel to the central axis;
    a holder for fixing the accommodating member, the holder comprising a stepped through hole and a plurality of protrusions around the stepped through hole, each of the protrusions being inserted in one of the slits at the end thereof;
    a resilient member sandwiched between the lens barrel and the holder, wherein the resilient member deforms between a compressed state and a recovered state as the external force is applied on the handle and the restricting elements move in and along the slits between a lower position on the protrusions and a higher position away from the protrusions, such that a focal length of the lens module is adjusted; and
    an image sensor accommodated in the holder and exposed from the stepped through hole.

* * * * *